United States Patent
Douma et al.

[11] Patent Number: 6,090,174
[45] Date of Patent: Jul. 18, 2000

[54] SEPARATOR DEVICE PROVIDED WITH A CYCLONE CHAMBER WITH A CENTRIFUGAL UNIT, AND VACUUM CLEANER PROVIDED WITH SUCH A SEPARATOR DEVICE

[75] Inventors: Jan A. Douma; Willem S. Wijma, both of Drachten, Netherlands

[73] Assignee: U.S. Philips Corporation, New York, N.Y.

[21] Appl. No.: 09/053,447

[22] Filed: Apr. 1, 1998

[30] Foreign Application Priority Data

Apr. 1, 1997 [EP] European Pat. Off. .............. 97200942

[51] Int. Cl.⁷ .................................................. B01D 45/16
[52] U.S. Cl. ................................ 55/337; 55/344; 55/345; 55/396; 55/397; 55/459.1; 55/DIG. 3
[58] Field of Search ............................. 55/337, 338, 345, 55/346, 397, 452, 459.1, 459.2, 344, 396, DIG. 3; 210/512.2, 512.3, 512.1, 787

[56] References Cited

U.S. PATENT DOCUMENTS

| | | | |
|---|---|---|---|
| 3,870,486 | 3/1975 | Eriksson et al. ................ | 55/DIG. 3 |
| 4,118,207 | 10/1978 | Wilhelm ........................... | 55/338 |
| 4,382,804 | 5/1983 | Mellor ............................. | 55/DIG. 3 |
| 4,593,429 | 6/1986 | Dyson ............................. | 55/DIG. 3 |
| 4,853,011 | 8/1989 | Dyson ............................. | 55/DIG. 3 |
| 5,229,014 | 7/1993 | Collins ............................ | 55/400 |
| 5,287,591 | 2/1994 | Rench et al. ................... | 55/DIG. 3 |
| 5,746,789 | 5/1998 | Wright et al. ................... | 55/406 |
| 5,761,764 | 6/1998 | Fiegel et al. .................... | 55/DIG. 3 |
| 5,779,745 | 7/1998 | Kilstrom ......................... | 55/DIG. 3 |
| 5,908,693 | 1/1999 | Krymsky ......................... | 55/DIG. 3 |

FOREIGN PATENT DOCUMENTS

| | | |
|---|---|---|
| 825538 | 12/1951 | Germany . |
| 7613475 | 6/1978 | Netherlands . |
| 495767 | 12/1969 | Switzerland . |

Primary Examiner—David A. Simmons
Assistant Examiner—Minh-Chau T. Pham
Attorney, Agent, or Firm—Ernestine C. Bartlett

[57] ABSTRACT

A separator device (3) provided with a cyclone chamber (11, 79) for separating solid and/or liquid particles from a gas flow. The cyclone chamber (11, 79) has an upper wall (49) in which an outlet opening (15) is present, and a substantially rotationally symmetrical side wall (47, 81) in which an inlet opening (13) is present adjacent the upper wall (49). A discharge opening (17, 85) for the separated solid and/or liquid particles is present at a side (55, 83) of the cyclone chamber (11, 79) remote from the upper wall (49). According to the invention, a rotatable annular centrifugal unit (61, 87) is arranged in the cyclone chamber (11, 79) around the outlet opening (15) near the upper wall (49), by means of which unit a short-circuit flow running directly from the inlet opening (13) to the outlet opening (15) in the cyclone chamber (11, 79) is prevented. The efficiency of the separator device (3) is considerably improved thereby. In a first embodiment, the centrifugal unit (61) comprises a rotatable annular disc (65) positioned adjacent and parallel to the upper wall (49). In a second embodiment, the centrifugal unit (87) comprises a rotatable rim of blades (89) which is partly countersunk into a recess (95) in the upper wall (49). The separator device (3) can be used in a cyclone vacuum cleaner (1).

19 Claims, 3 Drawing Sheets

SEPARATOR DEVICE PROVIDED WITH A CYCLONE CHAMBER WITH A CENTRIFUGAL UNIT, AND VACUUM CLEANER PROVIDED WITH SUCH A SEPARATOR DEVICE

BACKGROUND OF THE INVENTION

Separator device provided with a cyclone chamber with a centrifugal unit, and vacuum cleaner provided with such a separator device.

The invention relates to a separator device for separating solid and/or liquid particles from a gas flow, which separator device is provided with a cyclone chamber with a substantially rotationally symmetrical side wall, an upper wall, at least one inlet opening for the gas flow provided in the side wall adjacent the upper wall, an outlet opening for the gas flow provided in the upper wall, and a discharge opening for the separated solid and/or liquid particles provided at a side of the cyclone chamber remote from the upper wall.

The invention also relates to a vacuum cleaner provided with a housing in which a separator device is accommodated for separating solid and/or liquid particles from a gas flow, which separator device is provided with a cyclone chamber with a substantially rotationally symmetrical side wall, an upper wall, at least one inlet opening provided in the side wall adjacent the upper wall and capable of being coupled to a suction attachment, an outlet opening provided in the upper wall and connected to an electrical suction unit arranged in the housing, and a discharge opening provided at a side of the cyclone chamber remote from the upper wall, which discharge opening is connected to a holder for the separated solid and/or liquid particles.

A vacuum cleaner of the kind mentioned above and provided with a separator device of the kind mentioned in the opening paragraph is generally known as a cyclone vacuum cleaner. Such a separator device is provided with an inlet channel which issues into the inlet opening of the cyclone chamber and which is approximately tangentially oriented relative to the rotationally symmetrical side wall of the cyclone chamber. An underpressure is generated in the cyclone chamber by the suction unit of the vacuum cleaner during operation, so that a gas flow arises in the cyclone chamber from the inlet opening to the outlet opening. Since the inlet channel is oriented approximately tangentially relative to the side wall, the gas flow in the cyclone chamber comprises a spiraling portion starting from the inlet opening and merging into a core flow which is present in the center of the cyclone chamber and is directed towards the outlet opening. Solid and/or liquid particles present in the gas flow are separated from the gas flow in said spiraling portion of the gas flow under the influence of centrifugal forces and deposited against the side wall of the cyclone chamber, whereupon said particles are removed through the discharge opening of the cyclone chamber under the influence of the force of gravity.

A problem in such separator devices which has long been known is the so-called short-circuit flow which is present in the cyclone chamber in addition to the spiraling portion of the gas flow and the core flow and which is aimed from the inlet opening directly at the outlet opening. Solid and/or liquid particles in the short-circuit flow practically do not enter the spiraling portion of the gas flow and are accordingly badly separated from the gas flow in the cyclone chamber. The efficiency of the separator device is adversely affected by said short-circuit flow. In particular, comparatively light solid and/or liquid particles are not separated from the short-circuit flow. Besides comparatively light solid and/or liquid particles, foam particles especially fail to be separated from the short-circuit flow when such a separator device is used in a vacuum cleaner, in particular a combined dry and wet vacuum cleaner provided with a shampooing device.

A cyclone vacuum cleaner is known from NL-A-7613475 in which the outlet opening of the cyclone chamber comprises a tubular outlet channel in which a fan is journaled, capable of being driven into rotation by a motor. A secondary spiraling flow is generated in the outlet channel by the fan, so that comparatively light solid and/or liquid particles not separated from the gas flow in the cyclone chamber are separated from the gas flow in the outlet channel. Downstream of the outlet channel, there is a further fan which can be driven by a motor and which generates a clearing suction along the inner wall of the outlet channel. The particles separated from the secondary spiraling gas flow in the outlet channel are carried along by said clearing suction and finally removed towards the discharge opening of the cyclone chamber. The construction of this known cyclone vacuum cleaner as described above is comparatively complicated and occupies comparatively much space.

SUMMARY OF THE INVENTION

It is an object of the invention to provide a separator device of the kind mentioned in the opening paragraph and a vacuum cleaner of the kind mentioned in the second paragraph in which the adverse effect of the short-circuit flow on the efficiency of the separator device as described above is prevented as much as possible by comparatively simple means which occupy little space.

According to the invention, the separator device is for this purpose characterized in that the separator device is provided with an annular centrifugal unit which is positioned in the cyclone chamber adjacent the upper wall around the outlet opening and is rotatable about a centerline of the cyclone chamber.

The vacuum cleaner according to the invention is for this purpose characterized in that the separator device used therein is a separator device according to the invention.

The invention is based on the recognition that the short-circuit flow between the inlet opening and the outlet opening of the cyclone chamber occurs mainly through a boundary layer of the spiraling portion of the gas flow present along the upper wall of the cyclone chamber. In said boundary layer, the gas flow has a comparatively low flow velocity owing to friction between the upper wall and the gas flow, so that the centrifugal forces acting on the solid and/or liquid particles present in the boundary layer are comparatively small. The comparatively small centrifugal forces in the boundary layer have the result that, unless further measures are taken, in particular the comparatively light solid and/or liquid particles will be carried along by the gas flow in the boundary layer and conducted directly to the outlet opening. The centrifugal forces acting on the solid and/or liquid particles in the boundary layer along the upper wall are strongly increased in that the separator device according to the invention is provided with said centrifugal unit which is positioned in the cyclone chamber adjacent the upper wall around the outlet opening, so that also comparatively light solid and/or liquid particles are separated from said boundary layer by the centrifugal forces, and the efficiency of the separator device is considerably enhanced. Since said centrifugal unit is positioned inside the cyclone chamber around the outlet opening, the dimensions of the separator device need not be increased, and no constructional adaptations of the separator device need be carried out outside the cyclone chamber.

A special embodiment of a separator device according to the invention is characterized in that the centrifugal unit is rotatable during operation by means of a gas flow which enters the cyclone chamber through the inlet opening. Since the centrifugal unit is rotatable by means of the gas flow which enters the cyclone chamber, the separator device need not be provided with separate driving means for rotating the centrifugal unit, so that the construction of the separator device is further simplified.

A further embodiment of a separator device according to the invention is characterized in that the centrifugal unit is provided with an annular rotatable disc which is arranged adjacent and parallel to the upper wall around an outlet pipe which comprises the outlet opening. The positioning of the annular disc as close to the upper wall as possible has the result that a comparatively narrow, disc-shaped gap is present between the upper wall and the annular disc. When the annular disc rotates during operation, a so-called Couette flow with a comparatively great velocity gradient arises in said gap as a result of the friction between the upper wall and the gas in the gap and the friction between the annular disc and the gas in the gap. Owing to the great velocity gradient, comparatively great centrifugal forces are exerted on the solid and/or liquid particles present in said Couette flow, so that a strong separation of the solid and/or liquid particles from the Couette flow takes place in said gap.

A yet further embodiment of a separator device according to the invention is characterized in that the annular disc is provided with a rim of blades at a side facing away from the upper wall. The use of the rim of blades renders the annular disc rotatable by means of the gas flow which enters the cyclone chamber through the inlet opening in a simple and practical manner.

A special embodiment of a separator device according to the invention is characterized in that the centrifugal unit is provided with a rotatable rim of blades which is partly countersunk into a disc-shaped recess provided in the upper wall. Said rim of blades rotates during operation under the influence of the gas flow entering the cyclone chamber through the inlet opening. The boundary layer present during operation along the upper wall between the inlet opening and the outlet opening is disturbed by said recess and the rim of blades rotating therein. Solid and/or liquid particles present in said boundary layer are carried along by the rim of blades in its rotation, so that a centrifugal force is exerted on said solid and/or liquid particles under the influence of which said particles are separated from the gas flow.

A further embodiment of a separator device according to the invention is characterized in that the rim of blades is provided on a side of an annular disc facing away from the upper wall, which disc is provided at a side facing the upper wall with at least one raised annular threshold, while an annular groove mating with the annular threshold is provided in the recess of the upper wall, in which groove the annular threshold is rotatable. The annular threshold provided on the disc in combination with the annular groove provided in the upper wall forms a so-called labyrinth seal by means of which a possible leakage flow between the disc and the recess in the upper wall is prevented as much as possible.

BRIEF DESCRIPTION OF THE DRAWINGS

The invention will be explained in more detail below with reference to the drawing, in which FIG. 1 diagrammatically shows a vacuum cleaner according to the invention provided with a separator device according to the invention, FIG. 2 diagrammatically and in cross-section shows a first embodiment of a cyclone chamber of the separator device used in the vacuum cleaner of FIG. 1.

DESCRIPTION OF THE PREFERRED EMBODIMENTS

Figure 1:
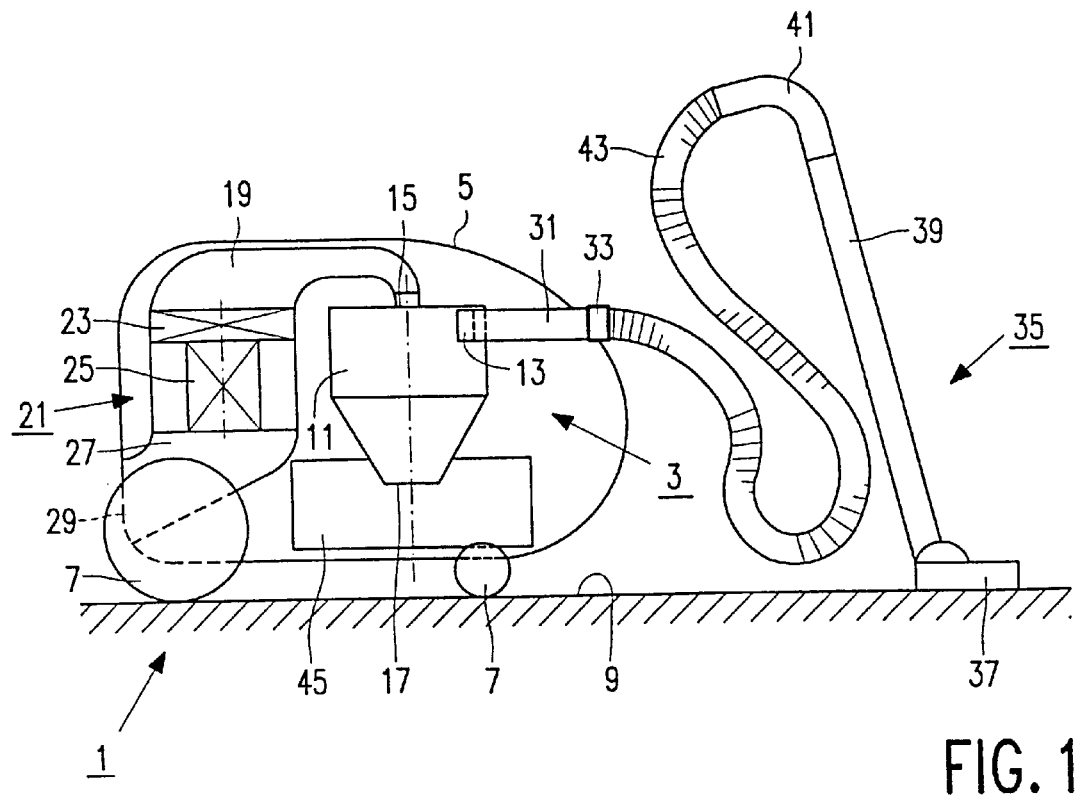

The vacuum cleaner 1 according to the invention which is diagrammatically shown in FIG. 1 is a so-called cyclone vacuum cleaner which is provided with a separator device 3 according to the invention for separating solid and/or liquid particles from an air flow which is present in the vacuum cleaner 1 during operation. The separator device 3, which is indicated only diagrammatically in FIG. 1 and will be explained in more detail below, is positioned in a housing 5 of the vacuum cleaner 1 which is displaceable over a surface 9 to be cleaned by means of wheels 7. The separator device 3 comprises a cyclone chamber 11 with an inlet opening 13 for the air flow, an outlet opening 15 for the air flow, and a discharge opening 17 for the solid and/or liquid particles which are separated from the air flow in the cyclone chamber 11 during operation. The outlet opening 15 of the cyclone chamber 11 is connected via an air channel 19 to an electrical suction unit 21 which is also arranged in the housing 5 and which is provided with a turbine 23 which is rotatable by means of an electric motor 25. The suction unit 21 is connected to an air outlet 29 provided in the housing 5 via a further air channel 27. The inlet opening 13 of the cyclone chamber 11 is connected via an inlet channel 31 to a coupling member 33 which is provided on the housing S and to which a suction attachment 35 of the vacuum cleaner 1 can be coupled. In the vacuum cleaner 1 shown in FIG. 1, the suction attachment 35 comprises a suction nozzle 37, a hollow tube 39, a hollow handle 41, and a flexible hose 43 which can be coupled to the coupling member 33. The discharge opening 17 of the cyclone chamber 11 is connected to a holder 45, also positioned in the housing 5, for the solid and/or liquid particles which have been separated from the air flow in the cyclone chamber 11 during operation.

Figure 2:
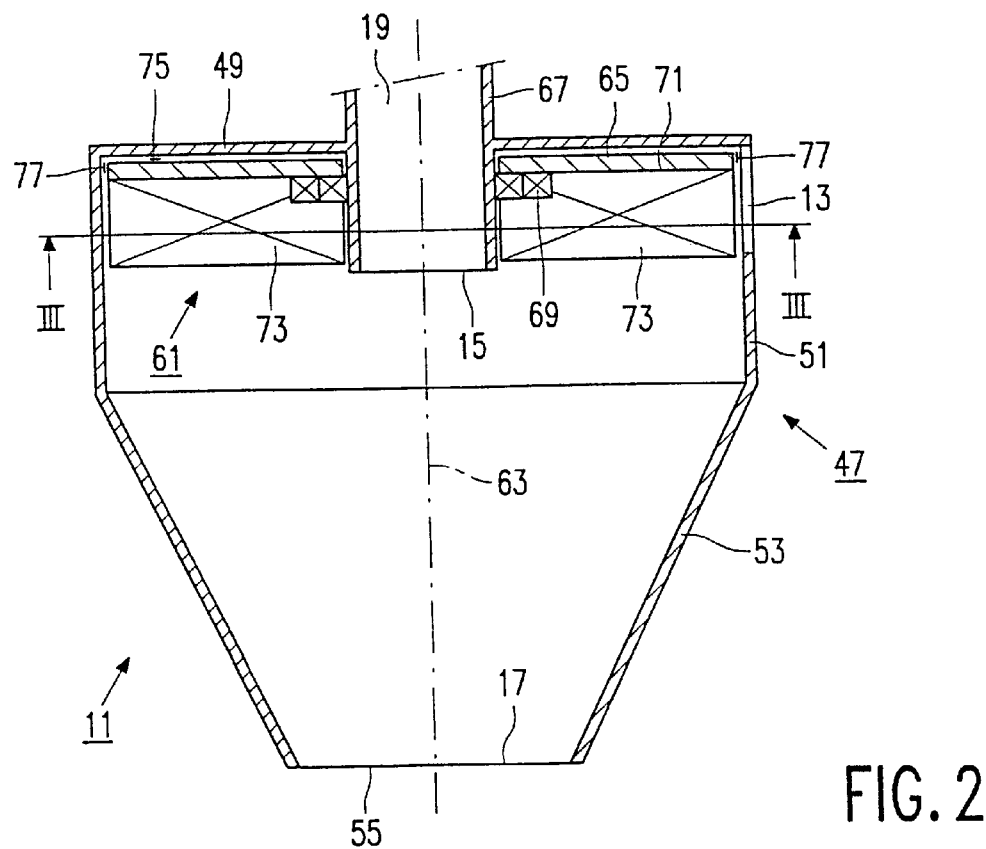

As FIG. 2 shows in detail, the cyclone chamber 11 of the separator device 3 in a first embodiment comprises a substantially rotationally symmetrical side wall 47 and an upper wall 49. The side wall 47 comprises a substantially circular-cylindrical upper portion 51 and a conical lower portion 53. It is noted that the cyclone chamber 11 according to the invention may alternatively be provided with a rotationally symmetrical side wall of a different shape, for example an exclusively circular-cylindrical side wall. The inlet opening 13 of the cyclone chamber 11 is provided in the circular-cylindrical portion 51 of the side wall 47 adjacent the upper wall 49, while the outlet opening 15 is provided approximately centrally in the upper wall 49. The discharge opening 17 of the cyclone chamber 11 is at a side 55 of the cyclone chamber 11 which is remote from the upper wall 49. It is noted that the cyclone chamber 11 according to the invention may alternatively be provided with more than one inlet opening 13, for example three inlet openings which are provided with equal mutual interspacings in the side wall 47 adjacent the upper wall 49 and which are connected to a common inlet channel via a distributor channel.

During operation, the suction unit 21 generates an underpressure in a flow channel of the vacuum cleaner 1 which comprises, in that order, the suction nozzle 37, the tube 39, the handle 41, the hose 43, the inlet channel 31, the cyclone chamber 11, and the air channel 19. Owing to this underpressure, an air flow arises in said flow channel from the suction nozzle 37 to the suction unit 21. Solid and/or liquid particles present on the surface 9 to be cleaned are carried along by said air flow and substantially separated from the air flow in the cyclone chamber 11 in a manner to be described in more detail below.

Figure 3:
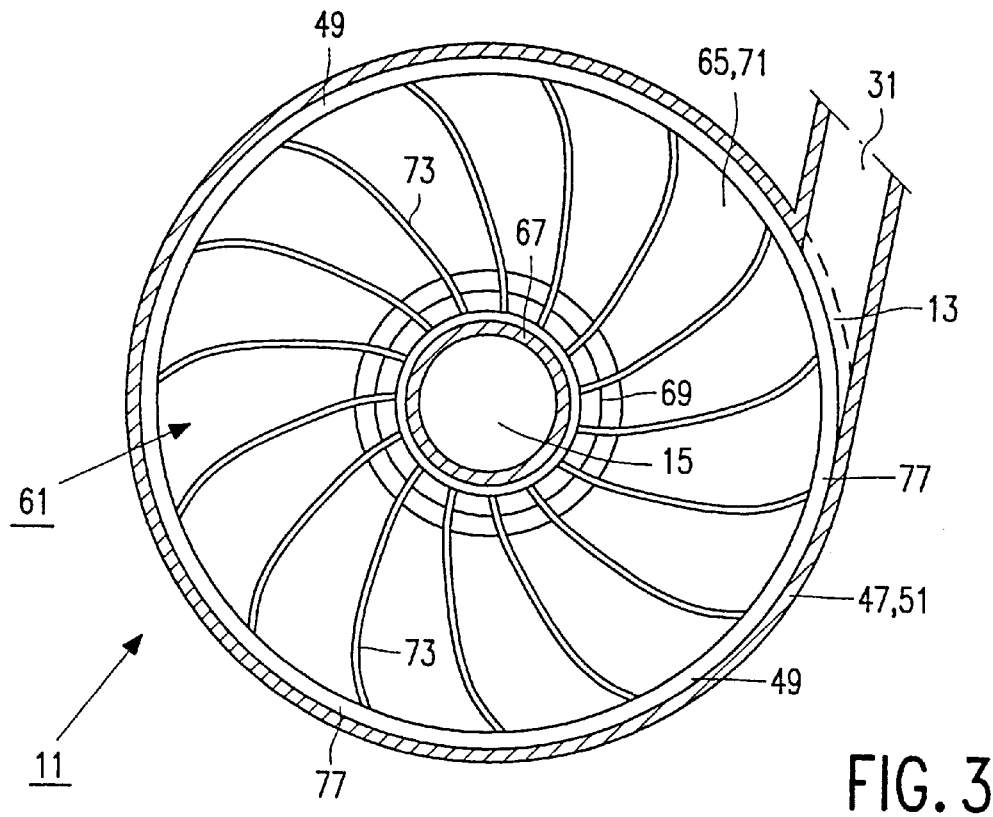
FIG. 3 is a cross-section taken on the line III—III in FIG. 2, FIG. 4 diagrammatically shows an air flow present during operation in the cyclone chamber of FIG. 2, and FIG. 5 diagrammatically and in cross-section shows a second embodiment of a cyclone chamber of the separator device used in the vacuum cleaner of FIG. 1.
Figure 4:
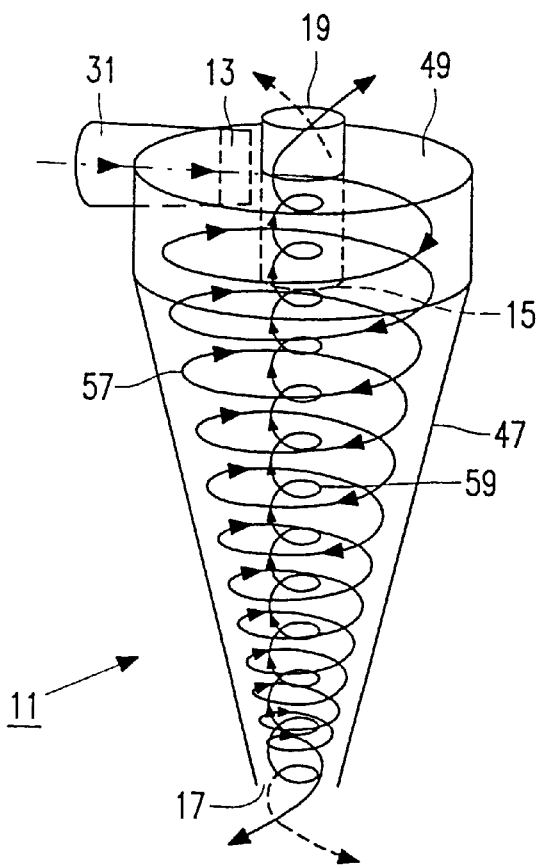

As FIG. 3 shows, the inlet channel 31, which issues into the inlet opening 13 of the cyclone chamber 11, is oriented substantially tangentially with respect to the rotationally symmetrical side wall 47. Since the inlet channel 31 is oriented substantially tangentially with respect to the side wall 47, the air flow in the cyclone chamber 11, as shown diagrammatically in FIG. 4, has a spiraling portion 57 starting from the inlet opening 13 which merges into a core flow 59 which is present in the center of the cyclone chamber 11 and which is directed towards the outlet opening 15. The solid and/or liquid particles present in the air flow are substantially separated from the air flow in the spiraling portion 57 of the air flow owing to the centrifugal forces acting on said particles and are deposited against the side wall 47, whereupon said particles are transported to the holder 45 through the discharge opening 17 under the influence of the force of gravity acting on said particles.

As FIG. 2 further shows, an annular centrifugal unit 61 is arranged in the cyclone chamber 11 of the separator device 3 adjacent the upper wall 49 around the outlet opening 15, which unit is rotatable about a centerline 63 of the cyclone chamber 11. In the first embodiment of the cyclone chamber 11 shown in FIG. 2, the centrifugal unit 61 comprises an annular disc 65 which is rotatable about the centerline 63 and is arranged adjacent and parallel to the upper wall 49 around an outlet pipe 67 which comprises the outlet opening 15. The annular disc 65 is journaled by means of a ball bearing 69, depicted diagrammatically only in FIG. 2, so that it can rotate relative to the outlet pipe 67. At a side 71 facing away from the upper wall 49, a rim of blades 73 is provided on the annular disc 65 by means of which the annular disc 65 is rotatable about the centerline 63 under the influence of the air flow entering the cyclone chamber 11 through the inlet opening 13 during operation. The annular disc 65 is positioned so close to the upper wall 49 that a comparatively narrow disc-shaped gap 75 is present between the upper wall 49 and the annular disc 65. When the annular disc 65 is rotated during operation, a so-called Couette flow having a comparatively great velocity gradient arises in the gap 75 as a result of the friction between the upper wall 49 and the air in the gap 75 and the friction between the disc 65 and the air in the gap 75. Owing to this great velocity gradient, comparatively great centrifugal forces are exerted on the solid and/or liquid particles present in the Couette flow, so that a strong separation of the solid and/or liquid particles from the Couette flow takes place in the gap 75. The solid and/or liquid particles thus separated pass through an annular gap 77 present between the disc 65 and the side wall 47 and enter the spiraling portion of the air flow in the cyclone chamber 11, from which said particles are separated in the manner described further above.

The use of the centrifugal unit 61 described above prevents the formation of a boundary layer of the spiraling portion 57 of the air flow in the cyclone chamber 11 which would be present along the upper wall 49 without the use of the centrifugal unit 61 as a result of frictional forces between the upper wall 49 and the spiraling portion 57 of the air flow. Owing to said frictional forces, the air flow in said boundary layer would have a comparatively low flow velocity, so that the air flow in the boundary layer would go directly from the inlet opening 13 to the outlet opening 15, and the centrifugal forces acting on the solid and/or liquid particles in the boundary layer would be comparatively small. Owing to the comparatively small centrifugal forces in the boundary layer, the comparatively light solid and/or liquid particles in particular would be mainly carried along directly from the inlet opening 13 to the outlet opening 15 by the air flow in the boundary layer, and would accordingly not be separated from the air flow in the cyclone chamber 11. The air flow described above which would be present in the boundary layer along the upper wall 49 without the use of the centrifugal unit 61 thus forms a so-called short-circuit flow between the inlet opening 13 and the outlet opening 15 which would seriously detract from the efficiency of the separator device 3. As was described above, the rotatable annular disc 65 of the centrifugal unit 61 used in the cyclone chamber 11 generates a Couette flow along the upper wall 49 in which comparatively great centrifugal forces occur, so that comparatively light solid and/or liquid particles present in the flow along the upper wall 49, for example foam particles, are also separated from said flow as much as possible. The use of the centrifugal unit 61 thus considerably increases the number of solid and/or liquid particles separated from the air flow in the cyclone chamber 11, so that the efficiency of the separator device 3 is substantially improved. The dimensions of the separator device 3 are not increased by the use of the centrifugal unit 61 because the centrifugal unit 61 is positioned entirely inside the cyclone chamber 11. The centrifugal unit 61 need not be provided with separate driving means for the annular disc 65 such as, for example, an electric drive motor positioned in or outside the cyclone chamber 11, because the annular disc 65 of the centrifugal unit 61 can be driven into rotation by the air flow entering the cyclone chamber 11 thanks to the use of the rim of blades 73. It is noted, however, that the invention also covers an embodiment in which the centrifugal unit 61 can be driven by such a drive motor or by alternative driving means.

Figure 5:
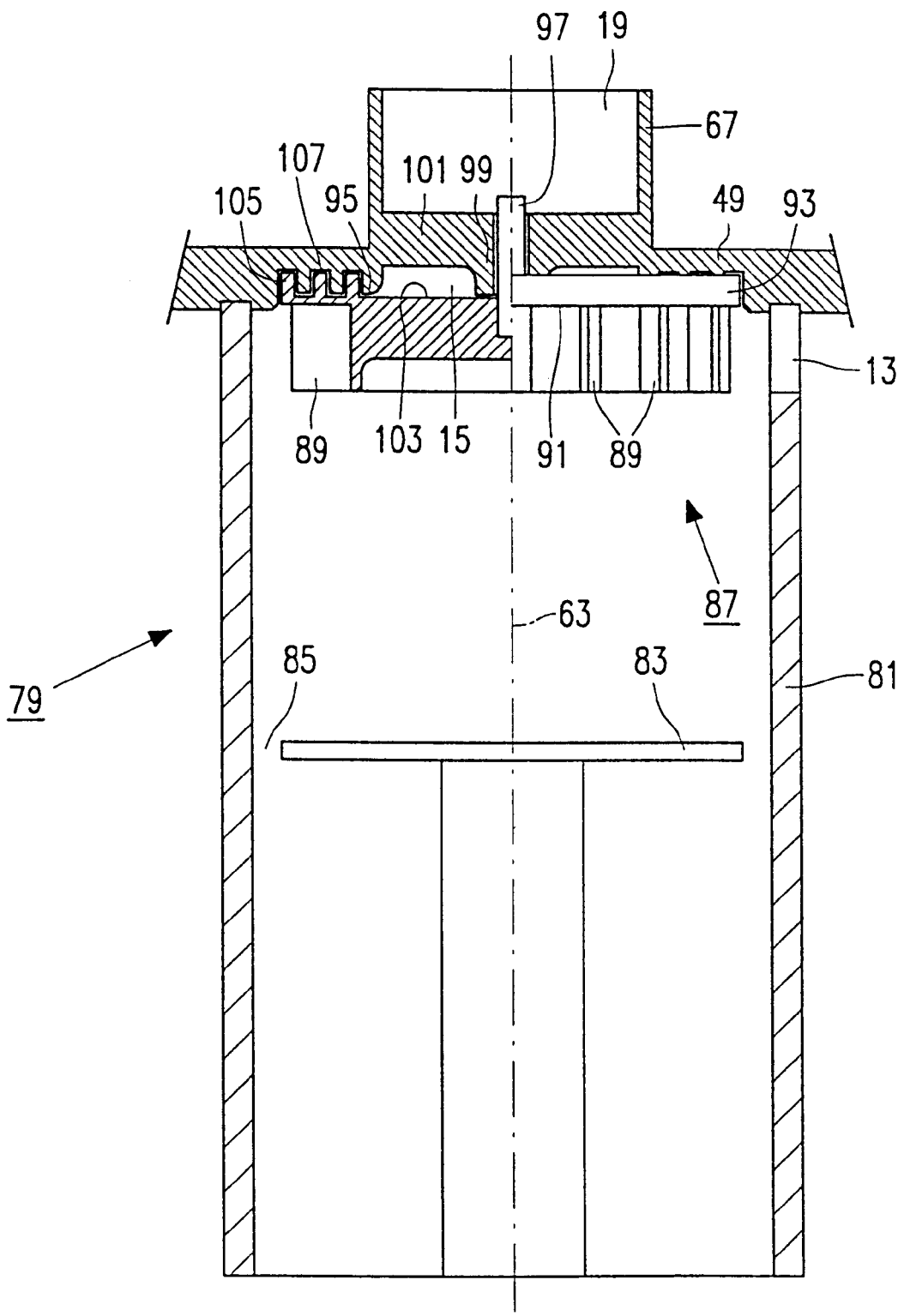

FIG. 5 shows a second embodiment of a cyclone chamber 79 suitable for use in the separator device 3 of the vacuum cleaner 1 instead of the cyclone chamber 11 described above. Components of the cyclone chamber 79 corresponding in essence to components of the cyclone chamber 11 described above have been given the same reference numerals in FIG. 5. The following description only deals with those components of the cyclone chamber 79 which are essentially different from those of the cyclone chamber 11.

The cyclone chamber 79 comprises a substantially circular-cylindrical side wall 81. A disc-shaped table 83 is arranged in the cyclone chamber 79, bounding the cyclone chamber 79 at a side remote from the upper wall 49. An annular opening forming a discharge opening 85 of the cyclone chamber 79 is present between the disc-shaped table 83 and the side wall 81. An annular centrifugal unit 87 rotatable about the centerline 63 of the cyclone chamber 79 is arranged adjacent the upper wall 49 and around the outlet opening 15 in the cyclone chamber 79, as was the case in the cyclone chamber 11. The centrifugal unit 87 comprises a rim of blades 89 provided on a side 91 of an annular disc 93 of the centrifugal unit 87 which faces away from the upper wall 49. The annular disc 93 is present in a disc-shaped recess 95 provided in the upper wall 49. The annular disc 93 is provided with a bearing pin 97 by means of which the annular disc 93 is journaled in a bearing bush 99 which is centrally arranged in the outlet pipe 67 and which is suspended in the outlet pipe 67 by means of a number, for example three, of spokes 101. The rim of blades 89 provided on the annular disc 93 is partly countersunk into the disc-shaped recess 95 in the upper wall 49.

During operation, the rim of blades 89 with the annular disc 93 is rotated in the recess 95 by the air flow entering the cyclone chamber 79 through the inlet opening 13. The boundary layer discussed further above, which would be present along the upper wall 49 without the use of the centrifugal unit 87 and which would result in said short-circuit flow between the inlet opening 13 and the outlet opening 15, is disturbed by the recess 95 in the upper wall 49 and the rim of blades 89 rotating therein during operation. The solid and/or liquid particles which are present in the air flow along the upper wall 49 are carried along in rotation by the rim of blades 89, so that a centrifugal force is exerted on said particles under the influence of which the particles are separated from the air flow and deposited on the side wall 81. The separated particles are subsequently removed through the discharge opening 85 of the cyclone chamber 79 under the influence of the force of gravity acting on the separated particles.

As FIG. 5 further shows, the annular disc 93 of the centrifugal unit 87 is positioned as deep as possible in the recess 95 in the upper wall 49, so that only a very narrow gap is present between the annular disc 93 and the upper wall 49. Furthermore, the annular disc 93 is provided with a number, for example three, of raised annular thresholds 105 at a side 103 facing the upper wall 49, while a number of annular grooves 107 corresponding with the annular thresholds 105 is provided in the recess 95 of the upper wall 49, in which grooves the annular thresholds 105 are rotatable. Said annular thresholds 105 and the corresponding annular grooves 107 form a so-called labyrinth seal by means of which a possible leakage flow through said gap between the upper wall 49 and the annular disc 93 is prevented as much as possible.

As was described above, the use of the centrifugal unit 87 considerably increases the number of solid and/or liquid particles separated from the air flow in the cyclone chamber 79, as did the use of the centrifugal unit 61 in the cyclone chamber 11 described earlier, so that the efficiency of the separator device 3 is considerably improved also when the cyclone chamber 79 with the centrifugal unit 87 is used.

The vacuum cleaner 1 described above is a floor-type vacuum cleaner, the housing 5 being displaceable over the surface 9 to be cleaned by means of the wheels 7. It is noted that a separator device according to the invention can also be used in an upright, handheld vacuum cleaner. Furthermore, the invention relates to vacuum cleaners designed for removing exclusively solid dust particles as well as to vacuum cleaners designed for removing liquid particles, or a combination of solid and liquid particles. The properties of a separator device according to the invention are particularly advantageous when the separator device is used in a vacuum cleaner suitable for removing solid as well as liquid particles and in addition provided with a shampooing device for the supply of shampoo to the surface to be cleaned. Such a vacuum cleaner usually sucks up foam particles during operation, which particles are substantially separated from the air flow by the separator device according to the invention.

It is further noted that a separator device according to the invention may be provided with a centrifugal unit of a type different from the centrifugal units 61 and 87 described above. An example of this is an embodiment in which the upper wall of the cyclone chamber is rotatable about the centerline of the cyclone chamber, so that the boundary layer along the upper wall is made to rotate. Another example is an embodiment in which the annular disc 65 of the centrifugal unit 61 is positioned not immediately adjacent the upper wall 49, as shown in FIG. 2, but is positioned at such a distance near the upper wall 49 around the outlet pipe 67 that the boundary layer along the upper wall 49 is not disturbed by the disc 65 rotating during operation and merges into a boundary layer along the outside of the outlet pipe 67. Said boundary layer along the outside of the outlet pipe 67 and the short-circuit flow occurring therein are interrupted in such an embodiment by the rotating disc 65 during operation.

It is finally noted that a separator device according to the invention may find an application in devices or appliances other than a cyclone vacuum cleaner. An example of this is a particle separator for use in a material manufacturing process.

What is claimed is:

1. A separator device for separating particles from a gas flow, which separator device is provided with a cyclone chamber with a substantially rotationally symmetrical side wall, an upper wall, at least one inlet opening for the gas flow provided in the side wall adjacent the upper wall, an outlet opening for the gas flow provided in the upper wall, and a discharge opening for the separated particles provided at a side of the cyclone chamber remote from the upper wall, wherein the separator device is provided with an annular centrifugal unit which is positioned in the cyclone chamber adjacent the upper wall around the outlet opening and is rotatable about a centerline of the cyclone chamber.

2. A separator device as claimed in claim 1, wherein the centrifugal unit is rotatable during operation by means of a gas flow which enters the cyclone chamber through the inlet opening.

3. A separator device as claimed in claim 1 wherein the centrifugal unit is provided with an annular rotatable disc which is arranged adjacent and parallel to the upper wall around an outlet pipe which comprises the outlet opening.

4. A separator device as claimed in claim 2 wherein the annular disc is provided with a rim of blades at a side facing away from the upper wall.

5. A separator device as claimed in claim 1 wherein the centrifugal unit is provided with a rotatable rim of blades which is partly countersunk into a disc-shaped recess provided in the upper wall.

6. A separator device as claimed in claim 5, wherein the rim of blades is provided on a side of an annular disc facing away from the upper wall, which disc is provided at a side facing the upper wall with at least one raised annular threshold, an annular groove mating with the annular threshold being provided in the recess of the upper wall, in which groove the annular threshold is rotatable.

7. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber.

8. A separator device as claimed in claim 2, wherein the centrifugal unit is provided with an annular rotatable disc which is arranged adjacent and parallel to the upper wall around an outlet pipe which comprises the outlet opening.

9. A separator device as claimed in claim 3, wherein the annular disc is provided with a rim of blades at a side facing away from the upper wall.

10. A separator device as claimed in claim 2, wherein the centrifugal unit is provided with a rotatable rim of blades which is partly countersunk into a disc-shaped recess provided in the upper wall.

11. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber and wherein the centrifugal unit is rotatable during operation by means of a gas flow which enters the cyclone chamber through the inlet opening.

12. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber and wherein the centrifugal unit is provided with an annular rotatable disc which is arranged adjacent and parallel to the upper wall around an outlet pipe which comprises the outlet opening.

13. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber and wherein the annular disc is provided with a rim of blades at a side facing away from the upper wall.

14. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber and wherein the centrifugal unit is provided with a rotatable rim of blades which is partly countersunk into a disc-shaped recess provided in the upper wall.

15. A vacuum cleaner as claimed in claim 14, wherein a separator device is accommodated for separating solid and/or liquid particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated solid and/or liquid particles, characterized in that wherein the rim of blades is provided on a side of an annular disc facing away from the upper wall, which disc is provided at a side facing the upper wall with at least one raised annular threshold, an annular groove mating with the annular threshold being provided in the recess of the upper wall, in which groove the annular threshold is rotatable.

16. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber.

17. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber, said centrifugal unit being rotatable during operation by means of a gas flow which enters the cyclone chamber through the inlet opening, and wherein the centrifugal unit is provided with an annular rotatable disc which is arranged adjacent and parallel to the upper wall around an outlet pipe which comprises the outlet opening.

18. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber and wherein the centrifugal unit is provided with an annular rotatable disc which is arranged adjacent and parallel to the upper wall around an outlet pipe which comprises the outlet opening, said annular disc being provided with a rim of blades at a side facing away from the upper wall.

19. A vacuum cleaner provided with a housing in which a separator device is accommodated for separating particles from a gas flow, which separator device is provided with a cyclone chamber with a substantially rotationally symmetrical side wall, an upper wall, at least one inlet opening provided in the side wall adjacent the upper wall for coupling with a suction attachment, an outlet opening provided in the upper wall and connected to an electrical suction unit arranged in the housing, and a discharge opening provided at a side of the cyclone chamber remote from the upper wall, which discharge opening is connected to a holder for the separated particles, wherein the separator device is provided with an annular centrifugal unit which is positioned in the cyclone chamber adjacent the upper wall around the outlet opening and is rotatable about a centerline of the cyclone chamber, said centrifugal unit being rotatable during operation by means of a gas flow which enters the cyclone chamber through the inlet opening, and wherein the centrifugal unit is provided with a rotatable rim of blades which is partly countersunk into a disc-shaped recess provided in the upper wall.

* * * * *